United States Patent [19]

Orchard

[11] 4,332,024
[45] May 25, 1982

[54] PHONOGRAPH TONE ARM WITH COUNTERWEIGHT AND METHOD OF USE

[75] Inventor: Anthony Orchard, Huntington Station, N.Y.

[73] Assignee: Avnet, Inc., New York, N.Y.

[21] Appl. No.: 147,531

[22] Filed: May 7, 1980

[51] Int. Cl.³ ............................................. G11B 13/10
[52] U.S. Cl. ..................................................... 369/254
[58] Field of Search ................. 274/23; 369/250, 251, 369/254, 253

[56] References Cited

U.S. PATENT DOCUMENTS

| | | | |
|---|---|---|---|
| 1,883,100 | 10/1932 | Terrell | 274/23 R X |
| 3,051,494 | 8/1962 | Walton | 274/23 R |
| 3,093,379 | 6/1963 | Fabel et al. | 274/23 R |
| 3,167,317 | 1/1965 | Wilson | 274/23 R |
| 3,261,609 | 7/1966 | Geiger | 274/23 R |
| 3,502,339 | 3/1970 | Tatter et al. | 274/23 R |

*Primary Examiner*—Harry N. Haroian
*Attorney, Agent, or Firm*—Richard P. Crowley

[57] ABSTRACT

An improved tone arm with counterweight assembly for use in a phonograph record player, the tone arm comprising at the rearward end a first counterweight sleeve element and a second counterweight, the first sleeve element having markings thereon to indicate the stylus force and adapted to be slidable on the arm and then to be secured in place, and the second counterweight adapted to be slidable over the sleeve element and in cooperation with the markings to be positioned, to provide the desired weight of stylus force to the stylus on the tone arm.

16 Claims, 2 Drawing Figures

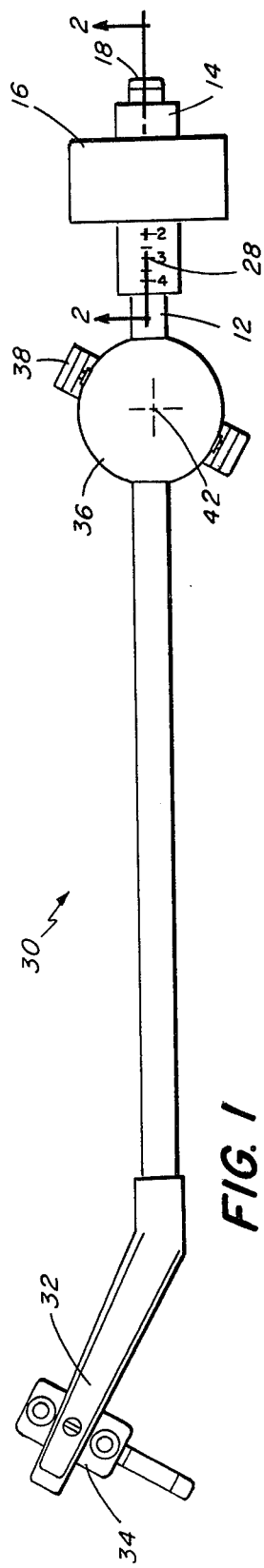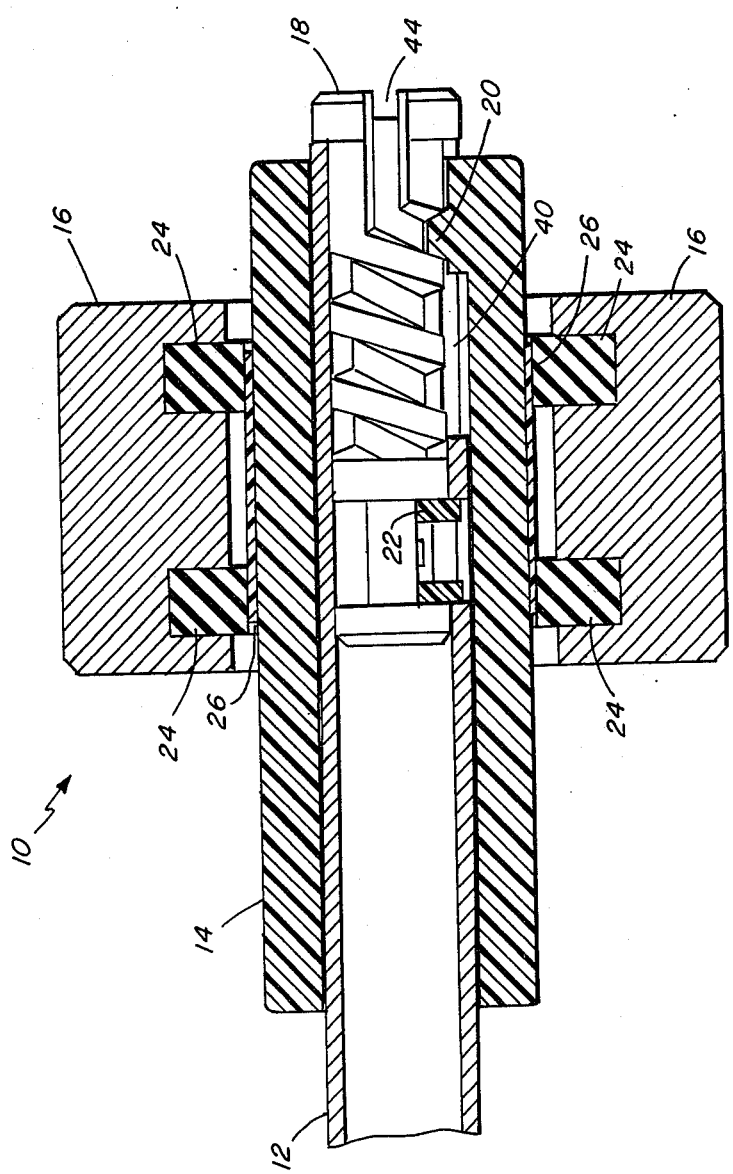

PHONOGRAPH TONE ARM WITH COUNTERWEIGHT AND METHOD OF USE

BACKGROUND OF THE INVENTION

Phonograph tone arms used in record players are generally of an elongated form and contain, at the one forward end, a pickup cartridge which includes a downwardly extending stylus thereon, the tip of which engages the grooves of the record for playing purposes. Intermediate of the forward and rearward ends of the tone arm, pivoting means are provided. Typically, a counterweight is employed on the rearward end of the tone arm, to provide for some adjustment of the pressure on the tip of the stylus by the weight and position of the counterweight.

The amount of stylus pressure typically measured in grams or a fraction of a gram or the stylus force is quite important. Excessive stylus force causes excessive record wear and may damage the record groove and affect playing performance, while insufficient force also affects record-playing performance and may permit the stylus tip to contact and damage the side walls of the record groove. In addition, since different pickup cartridges are used on tone arms with different weights, it is desirable to provide for a different or adjustable stylus force for optimum tracking. Thus, it is important to provide a stylus-force adjustment mechanism to be used in tone arm systems, and such mechanism should allow for the variation in weight of the pickup cartridges.

In practice, a number of adjustable counterweight systems have been proposed for use on phonograph tone arms. One system employs a sliding counterweight on the rearward end of the tone arm, which reads against stylus-force markings screened onto the exterior surface of the tone arm, whereby positioning of the slidable weight over the markings provides for desired stylus force.

Tone arms with counterweights are set forth, for example, in U.S. Pat. No. 3,093,379 which employs a weight which is adjusted by a threaded, precalibrated screw to the desired position. U.S. Pat. No. 3,167,317 discloses the use of a frictionally slidable counterweight and a threadably adjustable counterweight. U.S. Pat. No. 3,384,380 shows a counterweight secured to a screw for movement within a sleeve. U.S. Pat. No. 3,502,339 shows an adjustable counterweight with an adjustment of the weight by rotation of a screw. U.S. Pat. No. 3,417,999 provides a sleeve-like counterweight adjustable by a wheel on a sleeve. U.S. Pat. No. 3,416,807 shows a counterweight sleeve adjustable by pinion- or sleeve-engaging rack teeth on the tone arm. U.S. Pat. No. 3,378,267 discloses a spring-loaded sleeve counterweight on a tone arm.

SUMMARY OF THE INVENTION

This invention concerns a tone arm having a counterweight assembly, a record player containing the improved tone arm, and the method of manufacture and use of the tone arm. In particular, the invention relates to an improved tone arm with a counterweight assembly, which permits simple, rapid and accurate adjustment of the stylus force.

The invention provides for a simple method of accomodating different weights of pickup cartridges on tone arms and for adjusting the stylus force to the optimum tracking force. It has been discovered that a unique and improved counterweight system comprises a movable counterweight sleeve element with a calibration scale on the sleeve element, in combination with a second counterweight disposed on and positioned for movement over the first sleeve element. The counterweight system provides for movement of both counterweights, to obtain a zero balance of the tone arm, and, thereafter, by movement of only the second outer counterweight toward the pivot point of the tone arm, the precise amount of stylus force on the stylus tip can be produced. The second counterweight is moved to a desired position, with the stylus force indicated by the position of the record counterweight on the precalibrated markings or scales on the first sleeve element.

The counterweight assembly has means to secure the first counterweight in position on the tone arm, when the zero balance or other designated position of the first counterweight is reached. The first counterweight may be marked, such as slid over the tone arm by hand, and then secured in position to the tone arm by a simple mechanical means, such as a set screw in the sleeve element, which, on tightening one end, is secured against the tone arm. In one embodiment, the first counterweight is threadably moved with the second counterweight to a desired position, such as the zero-balance position.

The second counterweight optionally is isolated against further movement, once in the desired stylus-force position, by means to isolate the second counterweight from any vibrations or resonance from the tone arm. Isolation is accomplished by the use of resilient material, such as the use of rubber, plastic or elastomeric material, between the second counterweight and the first counterweight. Typically, isolation occurs through the use of peripheral rings of rubber surrounding the first counterweight, such as O-rings disposed in the second counterweight.

In addition, it is desirable to provide for low-friction slidable movement of the second counterweight over the first counterweight for ease of movement and adjustment of the second counterweight. The employment of low-friction material, or a coating or surface covering over the exterior surface of the first counterweight, such as the use of low-friction plastics, is desirable. The low-friction material should extend over that portion of the surface over which the second counterweight is slid while being adjusted. The low-friction material may comprise a Mylar belt material peripherally surrounding the first counterweight, or nylon, a fluorocarbin resin or other material.

In practice, the low-friction material and the material used to isolate the second counterweight should be so selected to provide, in contacting combination, easy movement and adjustment of the second counterweight, and yet enough frictional force to provide that the second counterweight will not be moved easily, once in the desired position. It has been found that the combination of a rubber isolation material and a plastic polyester material provides such operation, although other materials and combinations may be employed.

In operation of the tone arm and counterweight assembly, a zero balance is achieved by setting the second counterweight on the zero or other marking on the first counterweight, and then moving both the first and second counterweights, such as by use of a screw drive, until zero balance of the tone arm is accomplished. After the tone arm is balanced for the zero position, the second counterweight is then moved toward the pivot point, such as by sliding the second counterweight mounted on its O-ring isolator over the low-friction surface to the properly marked position on the first counterweight, which will produce the desired force on the stylus tip.

The tone arm and counterweight assembly of the invention will be shown and described for the purpose of illustration only in connection with a particular embodiment; however, it is recognized that various changes and modifications can be made by those persons skilled in the art, all without departing from the spirit and scope of the invention.

BRIEF DESCRIPTION OF THE DRAWINGS

FIG. 1 is an illustrative, top plan view of the tone arm of the invention; and

FIG. 2 is a cross-sectional view of the counterweight assembly of the tone arm of FIG. 1.

DESCRIPTION OF THE EMBODIMENTS

With reference to FIGS. 1 and 2, there is shown an improved tone arm 30 comprising a slender hollow tube 12 of aluminum or plastic, a bent cartridge housing 32 at the forward end and a counterweight assembly 10 at the rearward end. A stylus cartridge 34, with a stylus (not shown) having a tip adapted to track in the groove of a record, is attached to the cartridge 32. The bend in the cartridge housing 32 permits the stylus to track in the groove as near to tangentially as possible; thus, minimizing distortion of sound reproduction. The counterweight assembly 10 counterbalances the stylus cartridge 34, so that an adjustable, steady, tracking force may be applied to the record groove.

The tone arm 30 is designed to pivot in both the horizontal and vertical directions about a pivot point 42. This pivotal action is accomplished by gimbal rings 36 and 38. A similar two-gimbal ring tone arm is described in U.S. Pat. No. 3,949,995 and is hereby incorporated by reference.

In FIG. 2, the counterweight assembly 10 is shown in detail. The rearward end of the tone arm tube 12 is hollow and broken by a longitudinal slot 40. Retained within the tube 12 is a threaded, worm-drive screw 18. The screw 18 is retained within the tube 12 by a retainer 22 made of nylon, which projects inwardly from the tube wall, to secure in place the tip of the screw 18, and yet permit the worm-drive screw 18 to rotate freely within the tube 12. In the preferred embodiment, the head of the screw 18 may be rotated with any suitably shaped tool. Alternatively, the screw head may be formed as a knurled knob for rotation by hand. In one simple embodiment, the screw drive means for the sleeve 14 may be omitted, and the sleeve slid by hand and then secured in the zero-balance position by a threaded set screw threaded through the sleeve, so that one end may engage the surface of tube 12 and retain the sleeve in position.

The first counterweight sleeve element 14, made of aluminum or a plastic, surrounds the rearward end of the tube 12, and includes a pin 20 which projects inwardly through the longitudinal slot 40 in the tube 12, and engages the teeth of the worm-drive screw 18. As shown in FIG. 1, the outer top surface of the sleeve element 14, which is visible to the user, has marked thereon, such as by printing, a decal, embossing or other means, a calibrated number scale 28 in grams and fractions thereof. Additionally, as shown in FIG. 2, a portion of the outer surface of the sleeve element is coated or otherwise covered by a ring of low-friction material 26, such as Mylar or a polyester plastic.

The low-friction material engages the second counterweight 16, made of cold rolled steel or other suitable counterweight high-density material, adapted to be mounted slidably on the low-friction material 26. Two inner peripheral rings 24 of rubber, or other vitration- and resonance-absorbing material, are mounted on the inside of the second counterweight 16, to contact actually and to slide the second counterweight 16 over the sleeve 14 and its low-friction surface 26.

In operation, the second counterweight 16 is slid to a position on the sleeve element 14, where the marking means 28 indicates xero tracking force. The sleeve element 14 is then moved toward or backward by rotation of the screw 18, until the tone arm 30 is balanced about the pivot point 42. The second counterweight 16 then may be slid forward on the sleeve 14, until an appropriate tracking force is attained, as indicated by the marking means 28.

What I claim is:

1. An improved phonograph tone arm with a counterweight assembly for use with the phonograph tone arm, the tone arm comprising a tube hollow at the rearward end and characterized by a longitudinal slot at the hollow, rearward end, and having a stylus at the forward end thereof adapted to track upon a record for playing purposes, the tone arm adapted in use to be pivoted intermediate the forward and the rearward ends and having the counterweight assembly on the rearward end of the tone arm, to provide a calibrated, adjustable stylus tracking force, the improved counterweight assembly comprising:

(a) a first counterweight sleeve element movably mounted on the rearward end of the tone arm and adapted for forward or rearward movement on the tone arm;

(b) a second counterweight element slidably mounted for forward or rearward movement on the first sleeve element;

(c) marking means on said first counterweight sleeve element, to indicate the relative positions of the first and second counterweight elements; and (d) means to secure the first sleeve element to the tone arm in a desired zero or other predetermined stylus-force position, which means to secure comprises (i) a worm drive screw carried longitudinally within the rearward, hollow end of the tone arm, (ii) means to engage the worm drive screw extending through the longitudinal slot and into movable engagement with the worm drive screw, and (iii) means to rotate the worm drive screw, whereby the first sleeve element, with the second sleeve element mounted thereon, may be moved longitudinally between forward and rearward positions on the tone arm, whereby the second counterweight may be positioned at a predetermined point shown by the marking means, to provide for the adjustment of the desired stylus force which is displayed by the marking means.

2. The tone arm of claim 1 wherein:

(a) the tone arm comprises a hollow tube characterized by a longitudinal slot at the rearward end of the tube;

(b) the worm-drive screw is carried longitudinally within the one rearward end of the hollow tube;

(c) the means to rotate the screw comprises a slotted screw head at the one rearward end of the worm drive screw; and (d) the means to engage comprises an inner pin element which is secured to the first sleeve element and extends through the longitudinal slot into a cooperative engagement with the worm-drive screw.

3. The tone arm of claim 2 which includes a retainer to retain the worm-drive screw within the hollow tube of the tone arm.

4. The tone arm of claim 1 which includes isolation means to dampen vibrations and resonance between said first sleeve element on the tone arm and the second counterweight element.

5. The tone arm of claim 4 wherein the isolation means comprises one or more peripheral rings of resilient material disposed between the second counterweight and the sleeve element.

6. The tone arm of claim 1 wherein the outer surface of the first sleeve element includes a low-friction surface over at least those portions of the outer surface which are in slidable contact with the second counterweight element.

7. The tone arm of claim 1 wherein the first sleeve element further comprises a low-friction, polymeric, peripheral surface disposed between the sleeve element and the second counterweight element.

8. The tone arm of claim 1 wherein the second counterweight element includes:

(a) isolation means formed by one or more rings of resilient material disposed between the second counterweight and the sleeve element; and (b) a low-friction surface over the outer surface of the first sleeve element in contact with the second counterweight element, wherein the isolation means and the low-friction surface cooperate to permit the isolation means of the second counterweight element to slide easily along the low-friction surface of the first sleeve element, and yet remain staionary, once slid to an appropriate balance position.

9. The tone arm of claim 1 wherein the first counterweight sleeve element and the second counterweight element both comprise generally cylindrical elements, with the length of the second element less than the length of the first sleeve element, and with one end of the second counterweight element positioned over the marking means and serving to indicate, by the position of the end, the amount of stylus force.

10. The tone arm of claim 1 wherein the marking means is a visual marking means on the sleeve element, which means designates the force on the stylus in grams or fractions thereof.

11. A phonograph record player adapted to play phonograph records on a rotatable turntable, which player includes the tone arm of claim 1.

12. The tone arm of claim 1 wherein the marking means are calibrated lines on the surface of the first sleeve element, whereby, when the sleeve element and counterweight are initially secured to the tone arm at a point where the arm is balanced upon its pivot point, movement of the second counterweight towards the pivot point provides a stylus tracking force indicated upon the marking means in grams of force applied to the record by the stylus.

13. An improved phonograph tone arm with a counterweight assembly, the tone arm being hollow and having a stylus at the forward end thereof adapted to track upon a record for playing purposes, the hollow tone arm pivoted intermediate the forward and the rearward ends and having the counterweight assembly on the rearward end of the hollow tone arm, to provide a calibrated, adjustable stylus tracking force, the improved counterweight assembly comprising:

(a) a first, tubular, counterweight sleeve element slidably mounted on the rearward end of the tone arm and adapted for forward and rearward movement on the arm, the sleeve element including an inner pin which projects through a longitudinal slot in the tone arm toward the center of the hollow tone arm, and the sleeve element further including low-friction material about a major portion of the outer surface of the sleeve element;

(b) a second, tubular counterweight slidably mounted for forward and rearward movement on the first sleeve element, the second counterweight including isolation means of a resilient material disposed between the second counterweight and the sleeve element, whereby the isolation means and the low-friction material of the sleeve element cooperate to permit the second counterweight to slide easily along the sleeve, yet remain stationary when slid to an appropriate position;

(c) marking means on the first counterweight sleeve element which cooperate with the second counterweight, to indicate the relative positions of the first and second counterweight elements, the marking means being visually calibrated markings on the first sleeve element, whereby, when the sleeve element and the second counterweight are initially secured to the tone arm at the point where the arm is balanced upon its pivot point, movement of the second counterweight towards the pivot point provides a stylus tracking force, as indicated by the marking means in the force applied to the record by the stylus; and (d) means to secure the first sleeve element to the tone arm in a zero stylus-force position, the means comprising a threaded worm-drive screw which is carried longitudinally within the hollow tube of the tone arm and engages the inwardly projecting pin of the sleeve element in its screw threads, and includes a slotted screw head projecting from the one rearward end of the hollow tube, whereby rotation of the screw by the screw head occasions longitudinal movement of the sleeve element along the tone arm, and whereby, once the sleeve element and second counterweight are secured in the zero stylus-force position, the second counterweight may be slid along the sleeve element to provide for an adjustment of the stylus force, which force is displayed by the marking means.

14. An improved phonograph tone arm with a counterweight assembly for use with the phonograph tone arm, the tone arm having rearward and forward ends and having a stylus at the forward end thereof adapted to track upon a record for playing purposes, the tone arm adapted in use to be pivoted intermediate the forward and rearward ends, and having the counterweight assembly on the rearward end of the tone arm, to provide a calibrated, adjustable stylus tracking force, the improved counterweight assembly comprising:

(a) a first counterweight sleeve element movably mounted on the rearward end of the tone arm and adapted for movement between a forward or rearward position on the tone arm;

(b) a second counterweight element slidably mounted for forward or rearward movement on the first counterweight sleeve element;

(c) marking means on said first counterweight sleeve element, to indicate the relative position of the first and second counterweight elements;

(d) means to secure and to move the first sleeve element to and on the tone arm to a desired zero or other predetermined stylus-force position thereon, whereby the second counterweight element may be positioned at a predetermined point shown by the marking means, to provide for the adjustment of the desired stylus force which is displayed by the marking means;

(e) isolation means formed of a resilient material disposed between the second counterweight element and the first counterweight sleeve element, to dampen vibrations and resonance between the first element on the tone arm and the secod counterweight element; and (f) a low-friction surface material disposed over the outer surface of the first sleeve element and which is in slidable contact with the second counterweight element, wherein the isolation means and the low-friction surface material cooperate, to permit the isolation means of the second counterweight element to slide easily along the low-friction surface of the first sleeve element, and yet remain stationary, once slid to an appropriate balance position.

15. A phonograph record player adapted to play phonograph records on a rotatable turntable, which player includes the tone arm of claim 14.

16. The tone arm of claim 14 wherein the first counterweight sleeve element and the second counterweight element both comprise generally cylindrical elements, with the length of the second element less than the length of the first sleeve element, and with one end of the second counterweight element positioned over the marking means and serving to indicate, by the position of the end, the amount of stylus force.

* * * * *